United States Patent [19]

Paulik et al.

[11] Patent Number: 5,353,213
[45] Date of Patent: Oct. 4, 1994

[54] CIRCUIT CONFIGURATION FOR A SELF-OSCILLATING BLOCKING OSCILLATOR SWITCHED-MODE POWER SUPPLY

[75] Inventors: Ernst Paulik, Hilgertshausen; Rainer Dangschat, Landsham, both of Fed. Rep. of Germany

[73] Assignee: Siemens Aktiengesellschaft, Munich, Fed. Rep. of Germany

[21] Appl. No.: 108,771

[22] Filed: Aug. 18, 1993

Related U.S. Application Data

[63] Continuation of Ser. No. 725,631, Jul. 3, 1991, abandoned.

[30] Foreign Application Priority Data

Jul. 3, 1990 [EP] European Pat. Off. .......... 90112712

[51] Int. Cl.$^5$ ........................................... H02M 3/338
[52] U.S. Cl. ......................................... 363/19; 363/56; 363/89
[58] Field of Search ................ 363/19, 21, 37, 89, 363/56; 361/92

[56] References Cited

U.S. PATENT DOCUMENTS

| | | | |
|---|---|---|---|
| 3,428,882 | 2/1969 | Gilbert | 363/89 |
| 4,092,709 | 5/1978 | Voigt et al. | 363/18 |
| 4,513,226 | 4/1985 | Josephson | 315/219 |
| 4,683,529 | 7/1987 | Bucher, II | 363/44 |
| 5,075,837 | 12/1991 | Feldtkeller | 363/19 |

FOREIGN PATENT DOCUMENTS

0346849 12/1989 European Pat. Off. .
3025405 1/1982 Fed. Rep. of Germany .
3347930 8/1985 Fed. Rep. of Germany .

OTHER PUBLICATIONS

Siemens Product Information "Function and Use of the Flyback Converter IC TDA 4605", Order No. B111-6090.

Primary Examiner—Steven L. Stephan
Assistant Examiner—Adolf Berhane
Attorney, Agent, or Firm—Herbert L. Lerner; Laurence A. Greenberg

[57] ABSTRACT

A circuit configuration for a self-oscillating blocking-oscillator switched-mode power supply includes a transformer having a primary winding. A bridge rectifier has an output terminal. A semiconductor switch element is used for clocked application of an alternating voltage rectified by the bridge rectifier and unsmoothed to the primary winding. A control device has input terminals. The control device triggers the semiconductor switch element according to at least one primary current signal to be applied to one of the input terminals of the control device. A one-way rectifier configuration has an input side connected to the output terminal of the bridge rectifier and an output side connected through an RC element to the one input terminal of the control device.

9 Claims, 4 Drawing Sheets

CIRCUIT CONFIGURATION FOR A SELF-OSCILLATING BLOCKING OSCILLATOR SWITCHED-MODE POWER SUPPLY

This application is a continuation, of application Ser. No. 07/725,631, filed Jul. 3, 1991 now abandoned.

SPECIFICATION

The invention relates to a circuit configuration for a self-oscillating blocking-oscillator switched-mode power supply.

Switched-mode power supplies are high-frequency interference sources that require radio interference suppression. Supplying switched-mode power supplies with an alternating line voltage that needs rectification results in undesirable harmonic currents on the line. In the future, such harmonic currents will no longer be accepted by public utilities or comparable power supply facilities, because the limit values for allowable harmonic currents are being made increasingly stringent. The goal is therefore to provide a sinusoidal current consumption by the switched-mode power supplies.

While radio interference suppression in switched-mode power supplies previously functioned well, essentially because they were provided with current-compensated chokes, the harmonic currents in the utility line caused by the switched-mode power supplies continue to be ignored. Since the tightening of limit values for allowable harmonic currents applies equally to switched-mode power supplies in telecommunications equipment, such as television sets, the attempt must be made there as well to reduce the harmonic currents.

It is accordingly an object of the invention to provide a circuit configuration for a self-oscillating blocking-oscillator switched-mode power supply, which overcomes the hereinafore-mentioned disadvantages of the heretofore-known methods and devices of this general type, which is noncritical with respect to its harmonic currents originating in the utility line and which at least approximately enables a sinusoidal consumption of current from the utility line.

With the foregoing and other objects in view there is provided, in accordance with the invention, a circuit configuration for a self-oscillating blocking-oscillator switched-mode power supply, comprising a transformer having a first primary winding, a bridge rectifier having an output terminal, a semiconductor switch element for clocked application of an alternating voltage rectified by the bridge rectifier and unsmoothed to the first primary winding, a control device having input terminals, an RC element, the control device triggering the semiconductor switch element according to at least one primary current signal to be applied to a first one of the input terminals of the control device, and a one-way rectifier configuration having an input side connected to the output terminal of the bridge rectifier and an output side connected through the RC element to the first input terminal of the control device.

In accordance with another feature of the invention, the one-way rectifier configuration has a diode with an anode terminal to be supplied with the unsmoothed alternating voltage and a cathode terminal connected to the RC element, and a capacitor connected between the cathode terminal and a reference potential.

In accordance with a further feature of the invention, the bridge rectifier has a reference potential terminal, and there is provided a capacitor having a capacitance of less than approximately $10^{-6}$ F being connected parallel to the output terminal and the reference potential terminal of the bridge rectifier.

In accordance with an added feature of the invention, the bridge rectifier has two input terminals, and there is provided a current-compensated choke having a parallel-connected capacitor connecting the two input terminals of the bridge rectifier to terminals for an alternating voltage on a utility line.

In accordance with an additional feature of the invention, there is provided an interference suppression choke with a parallel-connected capacitor being connected between the input terminals of the bridge rectifier and the terminals for the alternating voltage on the utility line.

In accordance with yet another feature of the invention, there is provided a voltage divider connecting the output side of the one-way rectifier configuration to another of the input terminals of the control device.

In accordance with yet a further feature of the invention, there is provided at least one further RC element connecting the input side of the one-way rectifier configuration to another of the input terminals of the control device.

In accordance with a concomitant feature of the invention, there is provided a fuse connected between the output terminal of the bridge rectifier and the anode terminal of the diode.

Other features which are considered as characteristic for the invention are set forth in the appended claims.

Although the invention is illustrated and described herein as embodied in a circuit configuration for a self-oscillating blocking-oscillator switched-mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a schematic circuit diagram of a first circuit configuration of a free-oscillating blocking-oscillator switched-mode power supply according to the invention;

FIG. 2 a view similar to FIG. 1 of a second circuit configuration of a free-oscillating blocking-oscillator switched-mode power supply according to the invention;

Figure 1:
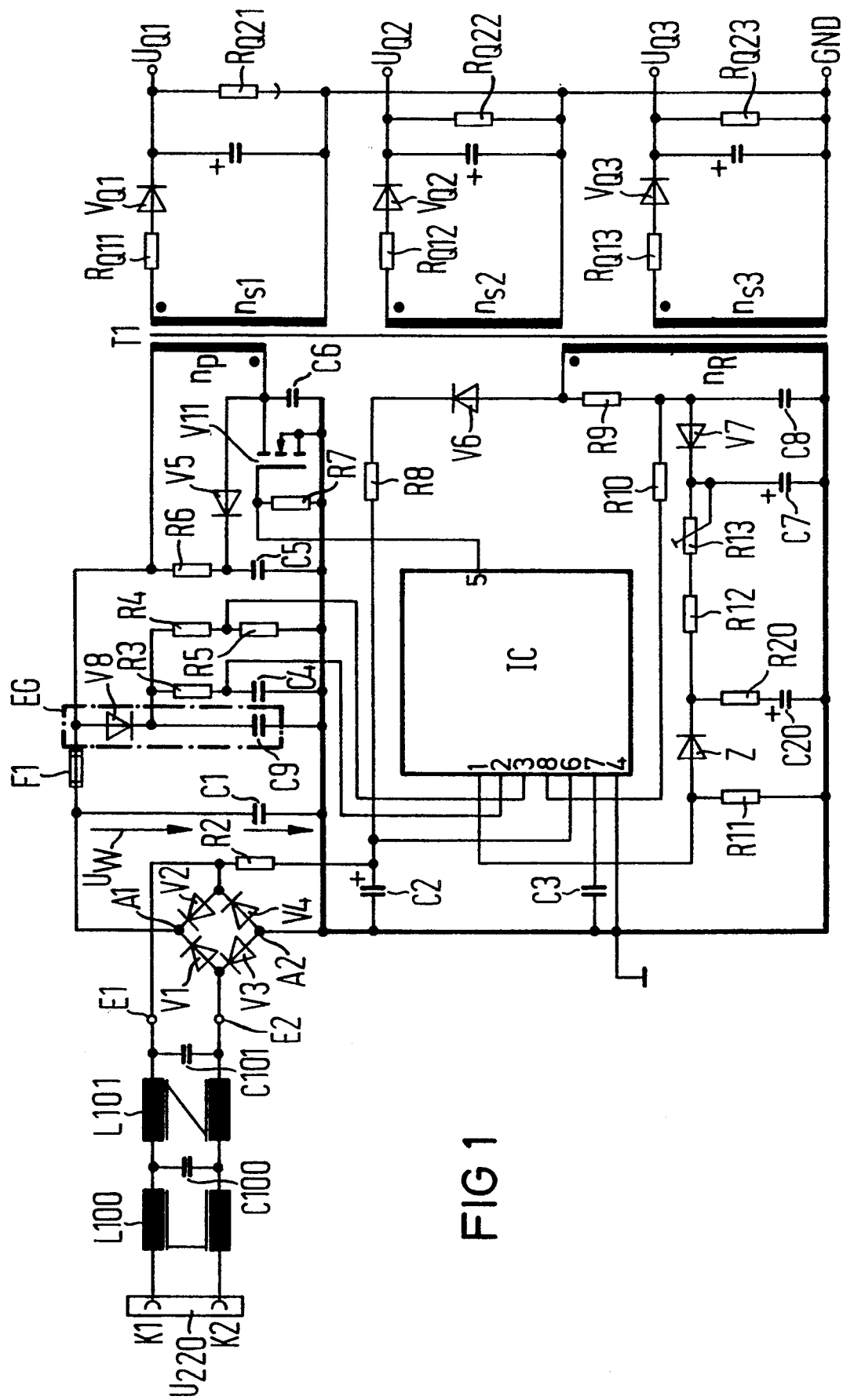

Referring now to the figures of the drawing in detail and first, particularly, to FIG. 1 thereof, there is seen a circuit configuration for a self-oscillating blocking-oscillator switched-mode or switching power supply as proposed by the invention. Except for certain differences in circuitry, which are essential to the invention and will be explained in further detail below, the circuit of FIG. 1 is equivalent to the circuit in FIG. 25 of the Siemens Product Information entitled "Funktion und Anwendung des Sperrwandler-IC TDA 4605" A Function and Use of the Blocking Oscillator IC TDA 4605U, Order No. B111-6090. For the sake of simplicity, the same reference numerals used therein will also be used herein.

A MOSFET is used as a semiconductor switch element V11, which periodically switches an alternating voltage $U_W$, rectified by a bridge rectifier with diodes V1, V2, V3, V4, to a first winding $n_p$ of a transformer T1 having a first secondary winding $n_{S1}$. The secondary winding $n_{S1}$ is connected to rectifier components having a resistor $R_{Q11}$ in series with a rectifier diode $V_{Q1}$ that is connected to an output terminal $U_{Q1}$, and having a load resistor $R_{Q21}$ connected in parallel with a smoothing capacitor that is connected to a common reference GND. Second and third secondary windings $n_{S2}$ and $n_{S3}$ have corresponding components, each however being designated with respective suffixes 2 and 3.

A fourth secondary winding nR, operating as a control winding, has one output connected to reference potential and another output feeding a control network through a resistor R9, supplying a control voltage to an input 1 of an IC control circuit TDA 4605 which will be described in more detail below.

According to the invention, the rectified alternating voltage $U_W$ is not smoothed, in contrast to previously known switched-mode power supplies. In order to trigger the semiconductor switch element V11, a control device IC is provided, which is switched on and off with pulse width modulation on the basis of at least one primary current signal to be applied to a first control voltage input terminal 2 of the control device IC, and preferably also on the basis of a voltage signal enabled by the control device IC and to be applied to a second input terminal 3 of the control device IC. In this exemplary embodiment, the TDA 4605 integrated circuit is used as the control device IC. The primary current signal is furnished through a one-way rectifier configuration EG, which is connected to the output terminal A1 of the bridge rectifier V1, V2, V3, V4 and is followed by an RC element R3, C4.

The voltage control signal is furnished by a voltage divider R4, R5 following the one-way rectifier configuration EG. To this end, the anode terminal of a diode V8 may be applied to the output terminal A1, suitably through a fuse F1. On one hand, the cathode terminal of the diode V8 is connected through a capacitor C9 to the output terminal A2, and on the other hand, the cathode terminal is connected to the RC element R3, C4 and to the voltage divider R4, R5. In this case, the RC element R3, C4 has a series circuit of the resistor R3 and the capacitor C4 which, like the two resistors R4, R5 of the voltage divider, are connected between the cathode terminal of the diode V8 and reference potential. The junction point between the resistor R3 and the capacitor C4 is connected to the first input terminal 2, and the junction point between the resistors R4, R5 is connected to the input terminal 3, of the integrated circuit or IC TDA 4605.

The switching element V11 is supported by a so-called snubber-circuit that serves to absorb the induction turn-off energy for each turn-off of the element V11. The snubber-circuit includes a capacitor C6, a diode V5, a capacitor C5 and a resistor R6. The diode V5 and the resistor R6 are connected in shunt with the primary winding $n_p$, the capacitor C5 is connected from the junction of the resistor R6 and the diode V5 to reference potential, and the capacitor C6 is connected from a switching electrode of the switch element V11 to reference potential.

A damping resistor R7 is connected between a connection to the control gate of the switching element V11 and an output terminal 5 of the IC TDA 4605 in order to dampen undesirable oscillations on this connection.

The IC TDA 4605 has a ground terminal 4 connected to reference potential which equals the mass of the entire power supply.

Figure 2:
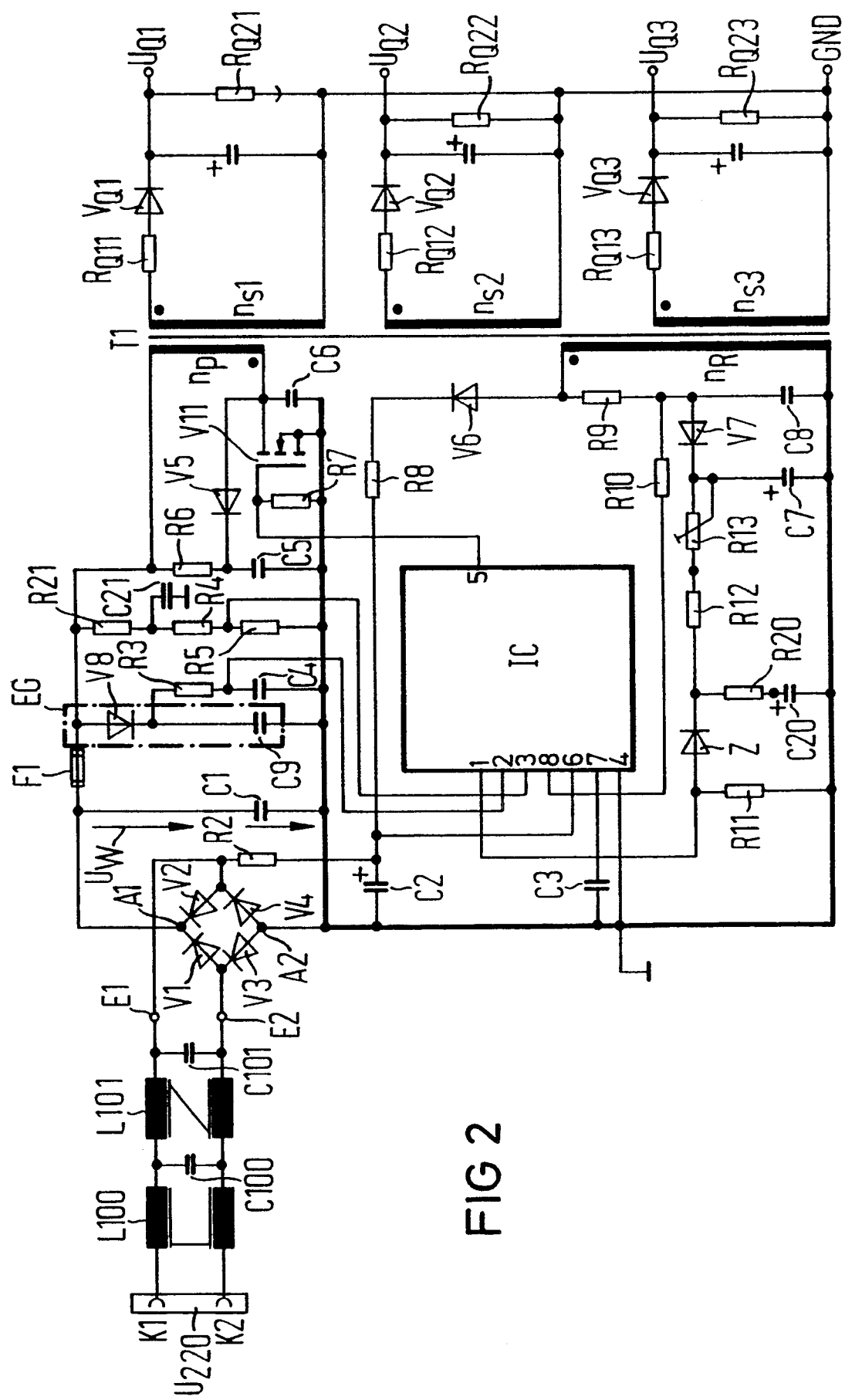

However, the voltage signal for enabling the control device IC may also be picked up on the input side at the one-way rectifier configuration EG, as shown in FIG. 2. To this end, the junction between the resistors R4 and R3 which is shown in FIG. 1 is opened in FIG. 2. In FIG. 2, the resistor R4 is connected through a resistor R21 of a further RC element R21, C21 to the anode terminal of the diode V8. The RC element R21, C21 and the voltage divider R4, R5 should be dimensioned in such a way that when an alternating power supply voltage $U_{220}$ from a utility line is applied to terminals K1, K2, a voltage is present at least at the second input terminal 3 of the control device IC that turns on the control device, and turns it off if the alternating line voltage is interrupted.

The control winding $n_R$ also operates to supply a voltage feed for the IC TDA 4605 by means of a rectifier diode V6 supplying rectified current halfwaves through a resistor R8 to a voltage feed terminal 6 of the IC, which also has a filter capacitor C2 connected to reference potential. A further current feed is supplied through a start-up resistor R2 connected at one end to the junction between diodes V2, V4 and at the other end to the current feed terminal 6 of the IC.

Not only the integrated circuit TDA 4605, but any control device that requires a primary current signal and a voltage signal which enables the control device, can be used as the control device IC. For instance, switched-mode power supply chips known as TDA 4600, TDA 4601 and TDA 4601D can also be used in the switched-mode power supply according to the invention. In the last-named integrated circuits, the primary current signal must be applied to the terminal 4, and the voltage signal must be applied to the terminal 5 of the respective integrated circuit.

Accordingly, since the semiconductor switch element V11 switches an unsmoothed alternating voltage $U_W$ to the primary winding $n_p$, 100 Hz noise occurs both at output terminals $U_{Q1}$, $u_{Q2}$ and $U_{Q3}$ on the secondary side and in a control voltage which is rectified through a diode V7 and a capacitor C7 and comes from a control winding $n_R$. The noise may, for instance, be eliminated by selecting the capacitance of the capacitor C7 to be as high as possible, or by connecting a series circuit of a resistor R20 and a capacitor C20 parallel to a resistor R11. The resistor R20 has a resistance of approximately 330 Ohms and the capacitor C20 has a capacitance of approximately 22 µF. In order to limit the current of the alternating voltage, a Zener diode Z can also be provided in such a way that its anode is connected to the resistor R11 and to the control input 1 of the IC and its cathode is connected to a resistor R12.

A soft-start feature is provided for the IC by means of a soft-start capacitor C3 connected between reference potential and a soft-start input terminal 7 of the IC.

The resistor R9 leading from the output terminal of control winding nR also feeds current to a resistor R10 connected to a zero crossing input 8 of the IC which operates to control the gain factor of the IC, which in turn controls the voltage stability of the output voltage.

A smoothing capacitor C8 connects the junction between resistors R9, R10 to reference potential. A variable resistor R13 which is connected in series with the diode V7 and the resistor R12 is provided as part of the voltage control network that operates to adjust the control voltage at the control terminal 1 of the IC TDA 4605.

The 100 Hz noise on the secondary side is simple to eliminate, for instance by means of generally known voltage stabilizers, such as TDB 78 XX voltage stabilizers.

Figure 3:
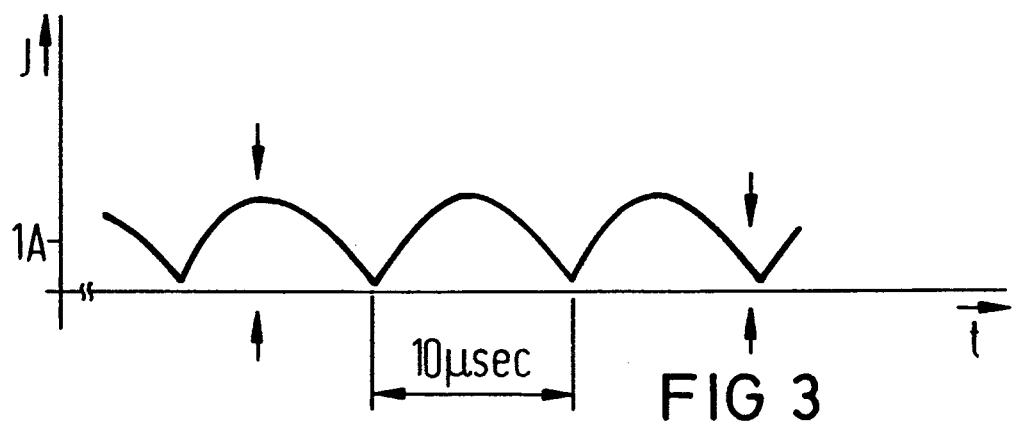
FIG. 3 is a graph of a flow of current through a semiconductor switch element of FIG. 1 with low time resolution.
Figure 4:
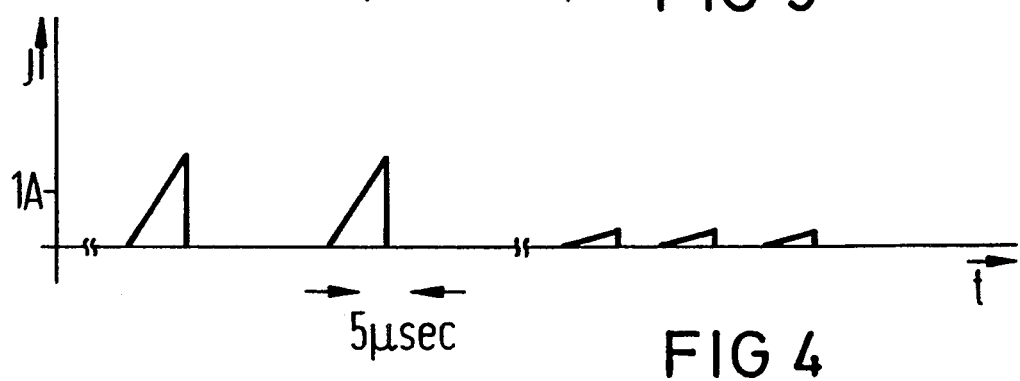
FIG. 4 is a graph of a flow of current through the semiconductor switch element of FIG. 1 with high time resolution.

The mode of operation of the switched-mode power supply shown in FIGS. 1 and 2 becomes apparent from FIGS. 3 and 4. FIG. 3 shows a drain current J through the MOSFET forming the semiconductor switch element V11 as a function of time t with low time resolution. A voltage of 220 V at 50 Hz is applied as the alternating line voltage to input terminals E1, E2 of the bridge rectifier V1, V2, V3, V4. It can be clearly seen that the semiconductor switch element V11 switches a current that is modulated at 100 Hz. FIG. 4 shows the course of current through the semiconductor switch element V11 with the time scale expanded 400 times as compared with FIG. 3, for two switch cycles of the semiconductor switch element V11 at a time, which are identified in FIG. 3 by arrows. The operation of the switched-mode power supply according to the invention as shown in FIGS. 1 and 2 differs in principle from previously known self-oscillating blocking-oscillator switched-mode power supplies, because in it, the best possible direct voltage is connected to the primary winding $n_p$ of the transformer T1.

Figure 5:
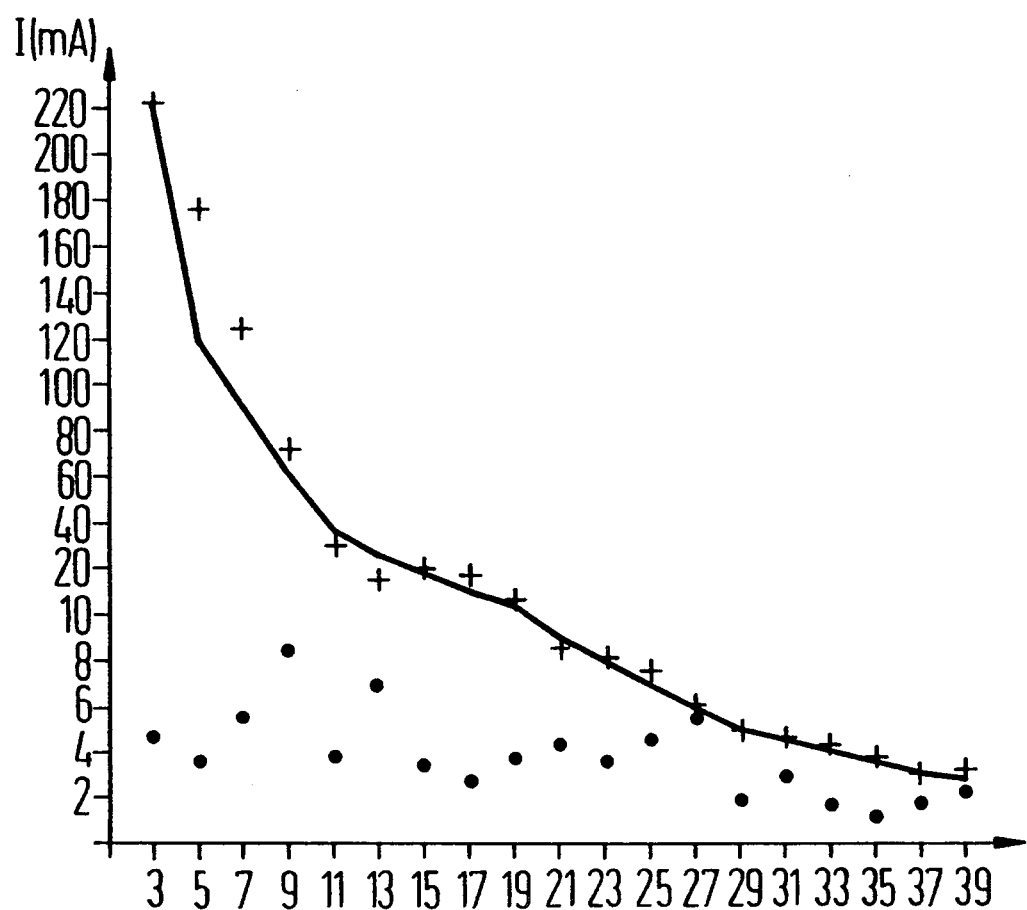
FIG. 5 is a graph of harmonic currents occurring in a utility line as a result of the switched-mode power supply of FIG. 1, as compared with harmonic currents in a previously known switched-mode power supply.

With the circuit configuration according to the invention, markedly fewer harmonic currents occur in the line than was typical in previously-known switched-mode power supplies. The harmonic currents remain markedly below the limit values required in a new version of VDE Vorschrift [German Electrical Engineers Association Standard] 0838. These limit values for the harmonic currents in the utility line are shown in FIG. 5 in the form of a continuous curve. In this drawing, the harmonics are plotted horizontally in increasing order, while the currents associated with them are plotted vertically in mA. Plus signs indicates the measured harmonic currents for a switched-mode power supply of the kind defined by the Siemens Product Information referred to at the outset, while dots mark the measured harmonic currents in the switched-mode power supply according to the invention as shown in FIGS. 1 or 2.

Figure 6:
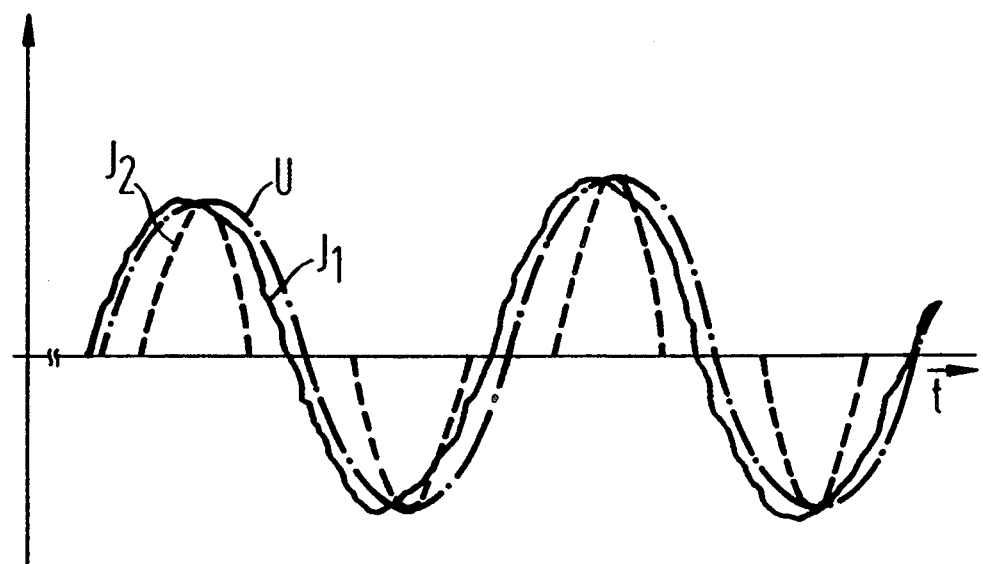
FIG. 6 is a graph of a sinusoidal course of current consumed from the utility line by the switched-mode power supply of FIG. 1.

Since the harmonic currents in the utility line are slight, the resultant current consumption by the switched-mode power supply according to the invention is approximately sinusoidal, as shown in FIG. 6 by a current course $J_1$. In contrast, a dotted line represents a current $J_2$ consumed from the utility line by a switched-mode power supply of the kind presented in FIG. 25 of the Siemens Product Information mentioned above. The line voltage is indicated by U reference symbol.

It has proved to be advantageous to expand the circuit configuration according to the invention as shown in FIGS. 1 and 2, with an interference suppression device on the input side. To this end, at least one current-compensated choke L100 with a parallel-connected capacitor C100 is connected between the terminals K1, K2 for an alternating line voltage U220 and the two input terminals E1, E2 of the bridge rectifier V1, V2, V3, V4. In addition, an interference suppression choke L101 with a parallel-connected capacitor C101 can be connected in the power supply lines carrying the alternating line voltage $U_{220}$. In FIGS. 1 and 2, respectively, both the current-compensated choke L100 and the parallel-connected capacitor C100 as well as the interference suppression choke L101 with the parallel-connected capacitor C101 are connected between the terminals K1, K2 and the input terminals E1, E2. This configuration assures that interference from the utility line to the switched-mode power supply, and vice versa, is largely suppressed.

We claim:

1. A circuit configuration for a self-oscillating blocking oscillator switched-mode power supply for drawing sinusoidal current from a power source, comprising a transformer having a primary winding, a bridge rectifier having an output terminal for providing a positive voltage, a semiconductor switch element for clocked application of an alternating voltage rectified by said bridge rectifier and unsmoothed to said primary winding, a control device having input terminals, an RC element providing a primary current signal, a voltage divider coupled in parallel to said RC element and providing a undervoltage detection signal for said alternating voltage, and a one-way rectifier configuration having an input side and an output side, said primary current signal being applied to one of said input terminals of said control device, said undervoltage detection signal being applied to another one of said input terminals of said control device, said control device triggering in pulse-width modulation mode said semiconductor switch element according to the primary current signal, said input side of said one-way rectifier being connected to said output terminal of said bridge rectifier, said RC element and said voltage divider being connected to said output side of said one-way rectifier.

2. The circuit configuration according to claim 1, wherein said one-way rectifier configuration has a diode with an anode terminal to be supplied with the unsmoothed alternating voltage and a cathode terminal connected to said RC element, and a capacitor connected between the cathode terminal and a reference potential.

3. The circuit configuration according to claim 1, wherein said bridge rectifier has a reference potential terminal, and including a capacitor having a capacitance of less than approximately $10^{-6}$ F being connected parallel to the output terminal and the reference potential terminal of said bridge rectifier.

4. The circuit configuration according to claim 1, wherein said bridge rectifier has two input terminals, and including a current-compensated choke having a parallel-connected capacitor connecting the two input terminals of said bridge rectifier to terminals for an alternating voltage on a utility line.

5. The circuit configuration according to claim 4, including an interference suppression choke with a parallel-connected capacitor being connected between the input terminals of said bridge rectifier and the terminals for the alternating voltage on the utility line.

6. The circuit configuration according to claim 1, wherein said bridge rectifier has two input terminals, and including an interference suppression choke with a parallel-connected capacitor connecting the input terminals of said bridge rectifier to terminals for an alternating voltage on a utility line.

7. The circuit configuration according to claim 1, including a voltage divider connecting the output side of said one-way rectifier configuration to another of the input terminals of said control device.

8. The circuit configuration according to claim 1, including at least one further RC element connecting the input side of said one-way rectifier configuration to another of the input terminals of said control device.

9. The circuit configuration according to claim 2, including a fuse connected between the output terminal of said bridge rectifier and the anode terminal of said diode.

* * * * *